United States Patent
Hodges et al.

(10) Patent No.: US 10,560,804 B2
(45) Date of Patent: Feb. 11, 2020

(54) SYSTEM AND METHOD FOR ENABLING MOBILE DEVICE APPLICATIONS AND FUNCTIONAL COMPONENTS

(71) Applicant: Location Labs, Inc., Emeryville, CA (US)

(72) Inventors: Daniel Hodges, San Francisco, CA (US); Tasos Roumeliotis, Orinda, CA (US); Scott Hotes, Berkeley, CA (US)

(73) Assignee: Location Labs, Inc., Emeryville, CA (US)

( * ) Notice: Subject to any disclaimer, the term of this patent is extended or adjusted under 35 U.S.C. 154(b) by 0 days.

(21) Appl. No.: 15/450,853

(22) Filed: Mar. 6, 2017

(65) Prior Publication Data
US 2017/0245111 A1    Aug. 24, 2017

Related U.S. Application Data (62) Division of application No. 13/688,142, filed on Nov. 28, 2012, now Pat. No. 9,591,452.

(51) Int. Cl.
*H04W 4/02* (2018.01)
*H04W 24/08* (2009.01)

(52) U.S. Cl.
CPC ........... *H04W 4/023* (2013.01); *H04W 4/025* (2013.01); *H04W 24/08* (2013.01)

(58) Field of Classification Search
CPC ...... H04W 4/023; H04W 4/025; H04W 24/08
See application file for complete search history.

(56) References Cited

U.S. PATENT DOCUMENTS

| | | |
|---|---|---|
| 3,778,809 A | 12/1973 | Hawes |
| 4,956,825 A | 9/1990 | Wilts et al. |
| 5,559,862 A | 9/1996 | Bhagat et al. |
| 5,673,691 A | 10/1997 | Abrams |
| 5,882,258 A | 3/1999 | Kelly et al. |
| 5,907,831 A | 5/1999 | Lotvin et al. |
| 5,973,683 A | 10/1999 | Cragun et al. |
| 6,011,973 A | 1/2000 | Valentine et al. |
| 6,151,507 A | 11/2000 | Laiho et al. |
| 6,161,008 A | 12/2000 | Lee et al. |

(Continued)

FOREIGN PATENT DOCUMENTS

| | | |
|---|---|---|
| EP | 1770969 | 4/2007 |
| FR | 2863439 | 6/2005 |
| WO | WO2011137279 | 11/2011 |

OTHER PUBLICATIONS

Kohavi, "Emerging Trends in Business Analytics", Communications of the ACM, Aug. 2002, vol. 45, No. 8, pp. 45-48.

*Primary Examiner* — Wayne H Cai
(74) *Attorney, Agent, or Firm* — Dovas Law, P.C.

(57) ABSTRACT

A computer-implemented method of enabling device use is provided. The method includes receiving from a first user an indication of at least one geographic area. Location information of a second user corresponding to a mobile device is received. The location information of the second user and the at least one geographic area are compared, and at least one of an application on the mobile device and a functional component of the mobile device are enabled based on the comparison of the location information of the second user and the at least one geographic area. A computing system for enabling device use is also provided.

10 Claims, 4 Drawing Sheets

(56) References Cited

U.S. PATENT DOCUMENTS

| | | |
|---|---|---|
| 6,690,940 B1 | 2/2004 | Brown et al. |
| 6,782,266 B2 | 8/2004 | Baer et al. |
| 7,178,720 B1 | 2/2007 | Strubbe |
| 7,181,229 B2 | 2/2007 | Singh et al. |
| 7,257,367 B2 | 8/2007 | Etuk et al. |
| 7,729,945 B1 | 6/2010 | Katz et al. |
| 7,869,792 B1 | 1/2011 | Zhou et al. |
| 7,899,438 B2 | 3/2011 | Baker et al. |
| 8,010,037 B2 | 8/2011 | Bannwolf et al. |
| 8,095,413 B1 | 1/2012 | Beaven |
| 8,121,879 B1 | 2/2012 | Cohen |
| 8,135,392 B2 | 3/2012 | Marcellino et al. |
| 8,175,642 B2 | 5/2012 | Shah |
| 8,193,982 B2 | 6/2012 | Kupfer |
| 8,270,933 B2 | 9/2012 | Riemer et al. |
| 8,280,438 B2 | 10/2012 | Barbara |
| 8,281,366 B1* | 10/2012 | McCorkendale ... G06F 21/6209 726/2 |
| 8,384,555 B2 | 2/2013 | Rosen |
| 8,401,521 B2 | 3/2013 | Bennett |
| 8,412,154 B1 | 4/2013 | Leemet et al. |
| 8,417,268 B1 | 4/2013 | Halferty et al. |
| 8,447,279 B1 | 5/2013 | Peng et al. |
| 8,527,013 B2 | 9/2013 | Guba et al. |
| 8,620,354 B2 | 12/2013 | Beasley |
| 8,621,075 B2 | 12/2013 | Luna |
| 8,635,708 B2 | 1/2014 | Mahan |
| 8,731,530 B1 | 5/2014 | Breed et al. |
| 8,738,688 B2 | 5/2014 | Myers |
| 8,761,321 B2 | 6/2014 | Tibbitts et al. |
| 8,825,035 B2 | 9/2014 | Moton, Jr. et al. |
| 8,843,122 B1 | 9/2014 | Wick et al. |
| 8,849,095 B2 | 9/2014 | Hoofien |
| 8,856,322 B2 | 10/2014 | Dare et al. |
| 8,971,927 B2 | 3/2015 | Zhou et al. |
| 8,982,781 B2 | 3/2015 | Starr |
| 9,019,068 B2 | 4/2015 | Varoglu |
| 9,042,872 B1 | 5/2015 | Breed et al. |
| 9,092,969 B2* | 7/2015 | McCown ............... G08B 21/00 |
| 9,124,703 B2 | 9/2015 | Tayadon |
| 9,723,092 B1* | 8/2017 | Kashanian ............. H04L 63/10 |
| 2001/0023198 A1 | 9/2001 | Muto |
| 2001/0029196 A1 | 10/2001 | Wakamatsu |
| 2002/0012894 A1 | 1/2002 | Becker |
| 2002/0016189 A1 | 2/2002 | Sheynblat et al. |
| 2002/0147037 A1 | 10/2002 | Kwon |
| 2002/0169539 A1 | 11/2002 | Menard et al. |
| 2002/0177475 A1 | 11/2002 | Park |
| 2002/0178046 A1 | 11/2002 | Lawrence |
| 2003/0005306 A1 | 1/2003 | Hunt et al. |
| 2003/0082508 A1 | 5/2003 | Barney |
| 2003/0105854 A1 | 6/2003 | Thorsteinsson et al. |
| 2003/0139175 A1 | 7/2003 | Kim |
| 2003/0158609 A1 | 8/2003 | Chiu |
| 2003/0211889 A1 | 11/2003 | Walker et al. |
| 2004/0024569 A1 | 2/2004 | Camillo |
| 2004/0030599 A1 | 2/2004 | Sie et al. |
| 2004/0039624 A1 | 2/2004 | Ikezawa et al. |
| 2004/0161085 A1 | 8/2004 | Home |
| 2004/0166878 A1 | 8/2004 | Erskine et al. |
| 2004/0203895 A1* | 10/2004 | Balasuriya ........ H04M 1/72577 455/456.1 |
| 2004/0219493 A1 | 11/2004 | Phillips |
| 2004/0267607 A1 | 12/2004 | Maddux |
| 2005/0003895 A1 | 1/2005 | Nara |
| 2005/0096009 A1 | 5/2005 | Ackley |
| 2005/0096030 A1 | 5/2005 | Boyd et al. |
| 2005/0243771 A1 | 11/2005 | Hardy et al. |
| 2005/0287502 A1 | 12/2005 | Southard et al. |
| 2006/0085547 A1 | 4/2006 | Cormier |
| 2006/0099965 A1 | 5/2006 | Aaron |
| 2006/0117263 A1 | 6/2006 | Locke |
| 2006/0184792 A1 | 8/2006 | Berlin |
| 2006/0270476 A1 | 11/2006 | Denkewicz |
| 2006/0276180 A1 | 12/2006 | Henry |
| 2007/0039624 A1 | 2/2007 | Roberts et al. |
| 2007/0150567 A1 | 6/2007 | Lamparello et al. |
| 2007/0203872 A1 | 8/2007 | Flinn et al. |
| 2007/0208802 A1 | 9/2007 | Barman |
| 2007/0214475 A1 | 9/2007 | Lee et al. |
| 2007/0232340 A1 | 10/2007 | Yamauchi et al. |
| 2007/0243852 A1 | 10/2007 | Gibbs |
| 2008/0146211 A1 | 6/2008 | Mikan et al. |
| 2008/0172317 A1 | 7/2008 | Deibert et al. |
| 2008/0199199 A1 | 8/2008 | Kato et al. |
| 2008/0201469 A1 | 8/2008 | Reasor et al. |
| 2008/0242311 A1 | 10/2008 | Craine et al. |
| 2008/0307243 A1 | 12/2008 | Lee |
| 2009/0017750 A1 | 1/2009 | Marcinkiewicz |
| 2009/0038005 A1 | 2/2009 | Howarth |
| 2009/0055938 A1 | 2/2009 | Samuel |
| 2009/0064316 A1 | 3/2009 | Liao et al. |
| 2009/0089876 A1 | 4/2009 | Finamore et al. |
| 2009/0098914 A1 | 4/2009 | Martin-Cocher et al. |
| 2009/0149203 A1 | 6/2009 | Backholm et al. |
| 2009/0181356 A1 | 7/2009 | Dasgupta |
| 2009/0203352 A1 | 8/2009 | Fordon et al. |
| 2009/0204471 A1 | 8/2009 | Elenbaas et al. |
| 2009/0251282 A1 | 10/2009 | Fitzgerald et al. |
| 2009/0236218 A1 | 11/2009 | Johnson et al. |
| 2009/0275367 A1 | 11/2009 | Reinisch et al. |
| 2009/0295562 A1 | 12/2009 | Shuster |
| 2009/0296904 A1 | 12/2009 | Brewer et al. |
| 2009/0298019 A1 | 12/2009 | Rogan et al. |
| 2009/0325566 A1 | 12/2009 | Bell et al. |
| 2010/0028344 A1 | 2/2010 | Wiseman |
| 2010/0058446 A1 | 3/2010 | Thwaites |
| 2010/0100618 A1 | 4/2010 | Kuhlke et al. |
| 2010/0113013 A1 | 5/2010 | Karabinis et al. |
| 2010/0116884 A1 | 5/2010 | Alderucci et al. |
| 2010/0125028 A1 | 5/2010 | Heppert |
| 2010/0145976 A1 | 6/2010 | Higgins et al. |
| 2010/0154024 A1 | 6/2010 | Boxmeyer et al. |
| 2010/0211887 A1 | 8/2010 | Woollcombe |
| 2010/0216509 A1 | 8/2010 | Riemer et al. |
| 2010/0235223 A1 | 9/2010 | Lyman |
| 2010/0250352 A1 | 9/2010 | Moore |
| 2010/0251336 A1* | 9/2010 | Allen, Jr. ............... G06F 21/316 726/4 |
| 2010/0268768 A1 | 10/2010 | Kurtenbach et al. |
| 2010/0285871 A1 | 11/2010 | Shah et al. |
| 2010/0317420 A1 | 12/2010 | Hoffberg |
| 2010/0332233 A1 | 12/2010 | Chen et al. |
| 2011/0029598 A1 | 2/2011 | Arnold et al. |
| 2011/0047078 A1 | 2/2011 | Ginter et al. |
| 2011/0053523 A1* | 3/2011 | Yeh ........................ H04B 1/406 455/73 |
| 2011/0070567 A1 | 3/2011 | Linton |
| 2011/0092159 A1 | 4/2011 | Park et al. |
| 2011/0145927 A1 | 6/2011 | Hubner et al. |
| 2011/0231280 A1 | 9/2011 | Farah |
| 2011/0236872 A1 | 9/2011 | Taylor |
| 2011/0244825 A1 | 10/2011 | Ewell |
| 2011/0244837 A1 | 10/2011 | Murata et al. |
| 2011/0250904 A1 | 10/2011 | Valleta et al. |
| 2011/0252375 A1 | 10/2011 | Chaudhri |
| 2011/0302003 A1 | 12/2011 | Shirish et al. |
| 2012/0008526 A1 | 1/2012 | Borghei |
| 2012/0036220 A1 | 2/2012 | Dare |
| 2012/0036245 A1 | 2/2012 | Dare et al. |
| 2012/0058744 A1 | 3/2012 | Felt et al. |
| 2012/0066088 A1 | 3/2012 | Murset |
| 2012/0069131 A1 | 3/2012 | Abelow |
| 2012/0072340 A1 | 3/2012 | Amron |
| 2012/0084349 A1 | 4/2012 | Lee et al. |
| 2012/0131161 A1 | 5/2012 | Ferris et al. |
| 2012/0135705 A1 | 5/2012 | Thaker |
| 2012/0142379 A1 | 6/2012 | Park |
| 2012/0143496 A1 | 6/2012 | Chitre et al. |
| 2012/0151384 A1 | 6/2012 | Stass et al. |
| 2012/0157076 A1 | 6/2012 | Choi et al. |
| 2012/0166285 A1 | 6/2012 | Shapiro et al. |
| 2012/0172027 A1 | 7/2012 | Partheesh et al. |
| 2012/0172100 A1 | 7/2012 | Colar et al. |

(56) References Cited

U.S. PATENT DOCUMENTS

| | | |
|---|---|---|
| 2012/0179767 A1 | 7/2012 | Clarke et al. |
| 2012/0195295 A1 | 8/2012 | Elmaleh |
| 2012/0214472 A1 | 8/2012 | Tayadon |
| 2012/0215328 A1 | 8/2012 | Schmeizer |
| 2012/0221877 A1 | 8/2012 | Prabu |
| 2012/0237908 A1 | 9/2012 | Fitzgerald et al. |
| 2012/0253918 A1 | 10/2012 | Marois et al. |
| 2012/0254949 A1 | 10/2012 | Mikkonen et al. |
| 2012/0258740 A1 | 10/2012 | Mildh et al. |
| 2012/0260118 A1 | 10/2012 | Jiang et al. |
| 2012/0271908 A1 | 10/2012 | Luna et al. |
| 2012/0280916 A1 | 11/2012 | Xia et al. |
| 2012/0311655 A1 | 12/2012 | Hohlfeld et al. |
| 2012/0323990 A1 | 12/2012 | Hayworth |
| 2012/0330702 A1 | 12/2012 | Kowalski et al. |
| 2013/0040629 A1 | 2/2013 | Sprigg et al. |
| 2013/0047229 A1 | 2/2013 | Hoefel |
| 2013/0054674 A1 | 2/2013 | Myers et al. |
| 2013/0055267 A1 | 2/2013 | Noro |
| 2013/0082878 A1 | 4/2013 | Jarvis et al. |
| 2013/0084847 A1 | 4/2013 | Tibbitts |
| 2013/0091453 A1 | 4/2013 | Kotler et al. |
| 2013/0102286 A1 | 4/2013 | Toksvig et al. |
| 2013/0104246 A1 | 4/2013 | Bear et al. |
| 2013/0111462 A1 | 5/2013 | Umansky et al. |
| 2013/0111510 A1 | 5/2013 | Baker et al. |
| 2013/0143528 A1 | 6/2013 | Randazzo et al. |
| 2013/0145007 A1 | 6/2013 | Randazzo et al. |
| 2013/0150004 A1 | 6/2013 | Rosen |
| 2013/0151628 A1 | 6/2013 | Catalano et al. |
| 2013/0177006 A1 | 7/2013 | Baek et al. |
| 2013/0198272 A1 | 8/2013 | Shionoya et al. |
| 2013/0198296 A1 | 8/2013 | Roy et al. |
| 2013/0225151 A1 | 8/2013 | King et al. |
| 2013/0283298 A1 | 10/2013 | Ali et al. |
| 2013/0303143 A1 | 11/2013 | Schrader et al. |
| 2013/0305384 A1 | 11/2013 | Weiss |
| 2013/0316746 A1 | 11/2013 | Miller et al. |
| 2013/0332886 A1 | 12/2013 | Cranfill et al. |
| 2013/0339345 A1 | 12/2013 | Soto et al. |
| 2013/0346333 A1 | 12/2013 | Hassler et al. |
| 2014/0057610 A1 | 2/2014 | Olincy et al. |
| 2014/0082065 A1 | 3/2014 | Anakata |
| 2014/0099921 A1 | 4/2014 | Weiss |
| 2014/0108649 A1 | 4/2014 | Barton et al. |
| 2014/0113558 A1 * | 4/2014 | Varoglu .......... H04W 12/08 455/41.2 |
| 2014/0143108 A1 | 5/2014 | Smith et al. |
| 2014/0148192 A1 | 5/2014 | Hodges et al. |
| 2014/0179261 A1 | 6/2014 | Riggs et al. |
| 2014/0180438 A1 | 6/2014 | Hodges et al. |
| 2014/0187219 A1 | 7/2014 | Yang |
| 2014/0194095 A1 | 7/2014 | Wynne et al. |
| 2014/0236846 A1 | 8/2014 | Melika et al. |
| 2014/0258357 A1 | 9/2014 | Singh et al. |
| 2014/0310327 A1 | 10/2014 | Yip et al. |
| 2014/0310365 A1 | 10/2014 | Sample et al. |
| 2014/0310403 A1 | 10/2014 | Weiss et al. |
| 2014/0316990 A1 | 10/2014 | Winston |
| 2014/0338006 A1 | 10/2014 | Grkov et al. |
| 2014/0364153 A1 | 12/2014 | Ren |
| 2014/0370857 A1 | 12/2014 | Bovis |
| 2015/0040246 A1 | 2/2015 | Yuen et al. |
| 2015/0058488 A1 | 2/2015 | Backholm |
| 2015/0079965 A1 | 3/2015 | Mullins |
| 2015/0095970 A1 | 4/2015 | Shetty |
| 2015/0097669 A1 | 4/2015 | Li |
| 2015/0099500 A1 | 4/2015 | Chalmers |
| 2015/0169853 A1 | 6/2015 | Singh |
| 2015/0188777 A1 | 7/2015 | Frost |
| 2015/0227752 A1 | 8/2015 | Anakata |
| 2015/0350410 A1 | 12/2015 | Weiss et al. |
| 2016/0014262 A1 | 1/2016 | Hodges et al. |
| 2017/0135045 A1 | 5/2017 | Hodges |

* cited by examiner

SYSTEM AND METHOD FOR ENABLING MOBILE DEVICE APPLICATIONS AND FUNCTIONAL COMPONENTS

CROSS REFERENCE TO RELATED APPLICATION(S)

This application is a division of U.S. patent application Ser. No. 13/688,142, filed Nov. 28, 2012, which is incorporated by reference as if fully set forth.

BACKGROUND

Parents are keen to keep an eye on their children's behavior and what media and information their children are exposed to. Further, parents endeavor to monitor and limit the amount of time their children spend exploring and consuming various electronic media (e.g. television and Internet content). The Internet and television represent a daunting amount of media and information, some of which parents may feel is not appropriate for their children to be exposed to. Many parents believe that there is such a thing as too much exposure to digital entertainment, even when benign.

In the past, parents could take pragmatic steps to keep an eye on their children's use of electronic media by limiting their children's access to media devices (e.g. television, family computer) to public or semi-public spaces within the home. For example, a parent may put the family computer or gaming console in the kitchen or den where a child could be easily monitored, instead of in the child's bedroom where monitoring the child may be difficult. With the advent of smartphones, laptops, tablets and other portable electronic devices, a child may now have un-tethered access to the Internet and a wide variety of digital entertainment in a very personal form factor. Accordingly, monitoring a child's access to electronic media has become much more difficult.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A computer-implemented method of enabling device use is provided. The method includes receiving from a first user an indication of at least one geographic area. Location information of a second user corresponding to a mobile device is received. The location information of the second user and the at least one geographic area are compared, and at least one of an application on the mobile device and a functional component of the mobile device are enabled based on the comparison of the location information of the second user and the at least one geographic area.

Further provided is a computing system comprising at least one non-transitory computer readable storage medium having encoded thereon instructions that, when executed by one or more processors of the system, cause the system to perform a process including receiving location information of a user corresponding to a mobile device. The location information of the user and at least one geographic area are compared, and at least one of an application on the mobile device and a functional component of the mobile device are enabled based on the comparison of the location information of the user and the at least one geographic area.

Further provided is non-transitory computer-readable media tangibly embodying a program of instructions executable by at least one computing system to implement a method, the at least one computing system being capable of interfacing with a communications network, the method comprising receiving location information of a user corresponding to a mobile device. The location information of the user and at least one geographic area are compared, and at least one of an application on the mobile device and a functional component of the mobile device are enabled based on the comparison of the location information of the user and the at least one geographic area.

Further provided is a computer-implemented method of enabling device use, the method comprising receiving a wireless signal transmitted between a first mobile device and a second mobile device. At least one of a particular application and a particular functional component of at least one of the first mobile device and the second mobile device is enabled responsive to receiving the wireless signal. The strength of the received wireless signal is determined to have decreased below a particular level, and the at least one of the particular application and the particular functional component is disabled responsive to determining the strength of the received wireless signal has decreased below a particular level.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Embodiments are described below with reference to the drawing figures where like numerals represent like elements throughout.

Figure 1:
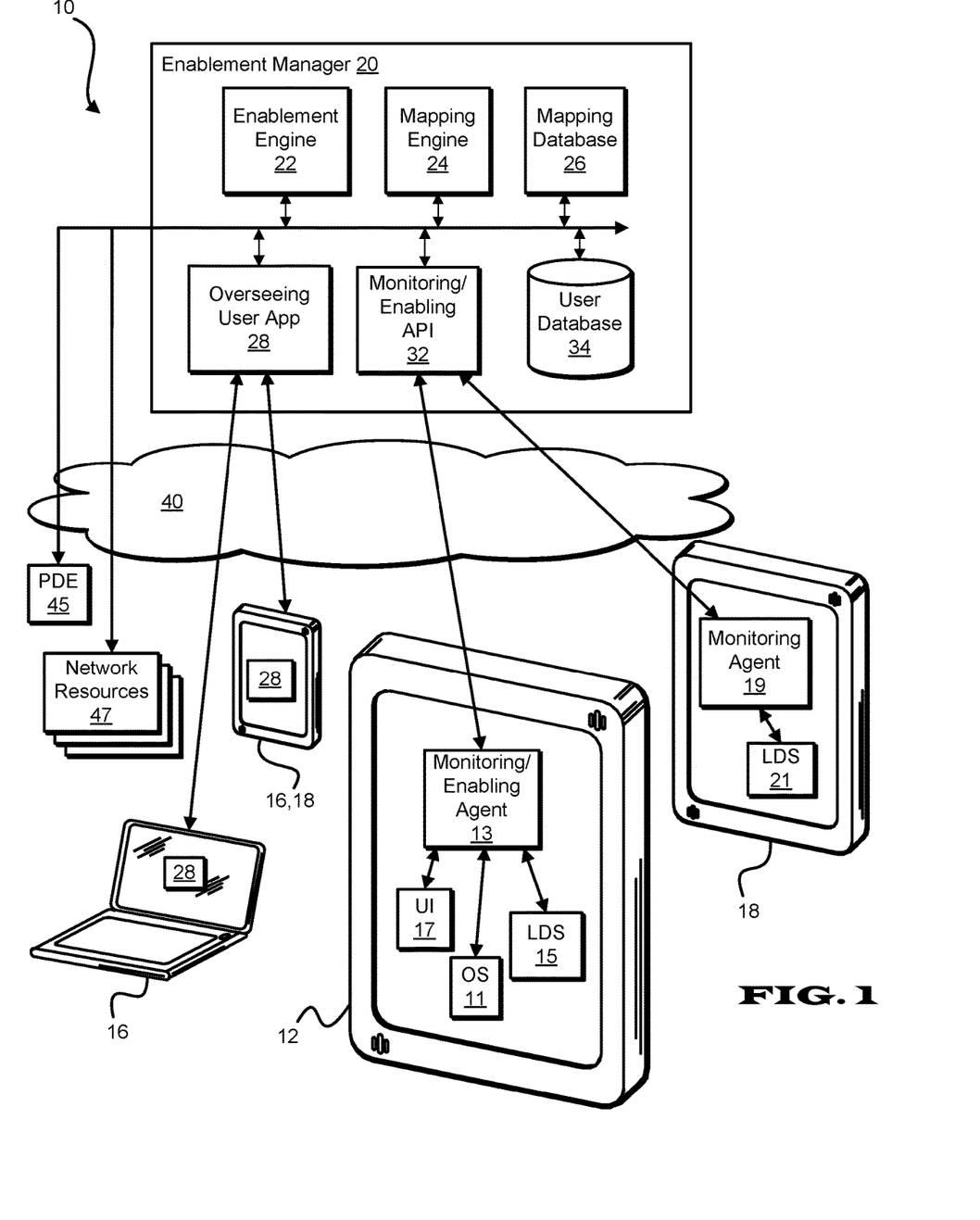
FIG. 1 shows a system for enabling and disabling mobile device functional components and applications.

Referring to FIG. 1, a system 10 is provided including an enablement manager 20 used for providing notification regarding a particular user's location to another user. The enablement manager 20 includes an enablement engine 22, a mapping engine 24, a mapping database 26, a overseeing user application 28, a monitoring/enablement application program interface ("API") 32, and a user database 34. The enablement manager 20 can be implemented on one or more network-connectable computing systems and need not be implemented on a single system at a single location. The enablement manager 20 is configured for communication via the network 40 with other network-connectable computing systems including a wireless mobile communication device ("mobile device") 12 corresponding to a monitored user, client devices 16 corresponding to a user who configures the enablement manager 20, and a mobile device 18 which generates position data for defining a geographic area. Alternatively, the enablement manager 20 or one or more components thereof can be executed on the monitored mobile device 12 or other system. The overseeing user application 28 includes a web application or other application enabled by the enablement manager 20 and accessible to a client device 16 via a network and/or installed and executed on the client device 16.

The mobile devices 12, 18 can include for example a smartphone or other wireless mobile terminal preferably configured to operate on a wireless telecommunication network. The client devices 16 can include any suitable wired or wireless device configured for operation on a wired or wireless telecommunication network. The operation of the enablement manager 20 is described herein with respect to the devices 12, 16, 18. One skilled in the art will recognize that the enablement manager 20 can operate with other suitable wired or wireless network-connectable computing systems.

Software and/or hardware residing on a monitored mobile communication device 12 enables a monitoring/enabling agent 13 in the form of a client application which can provide location information to the enablement manager 20 via the monitoring/enabling API 24. In addition to components enabling data processing and wireless communication, the mobile device 12 includes a location determination system ("LDS") 15, such as a global positioning system ("GPS") receiver, from which the monitoring/enabling agent 13 gathers data used for determining location of the mobile device 12. A monitored user carries the mobile device 12 on their person with the monitoring/enabling agent 13 active.

Figure 2:
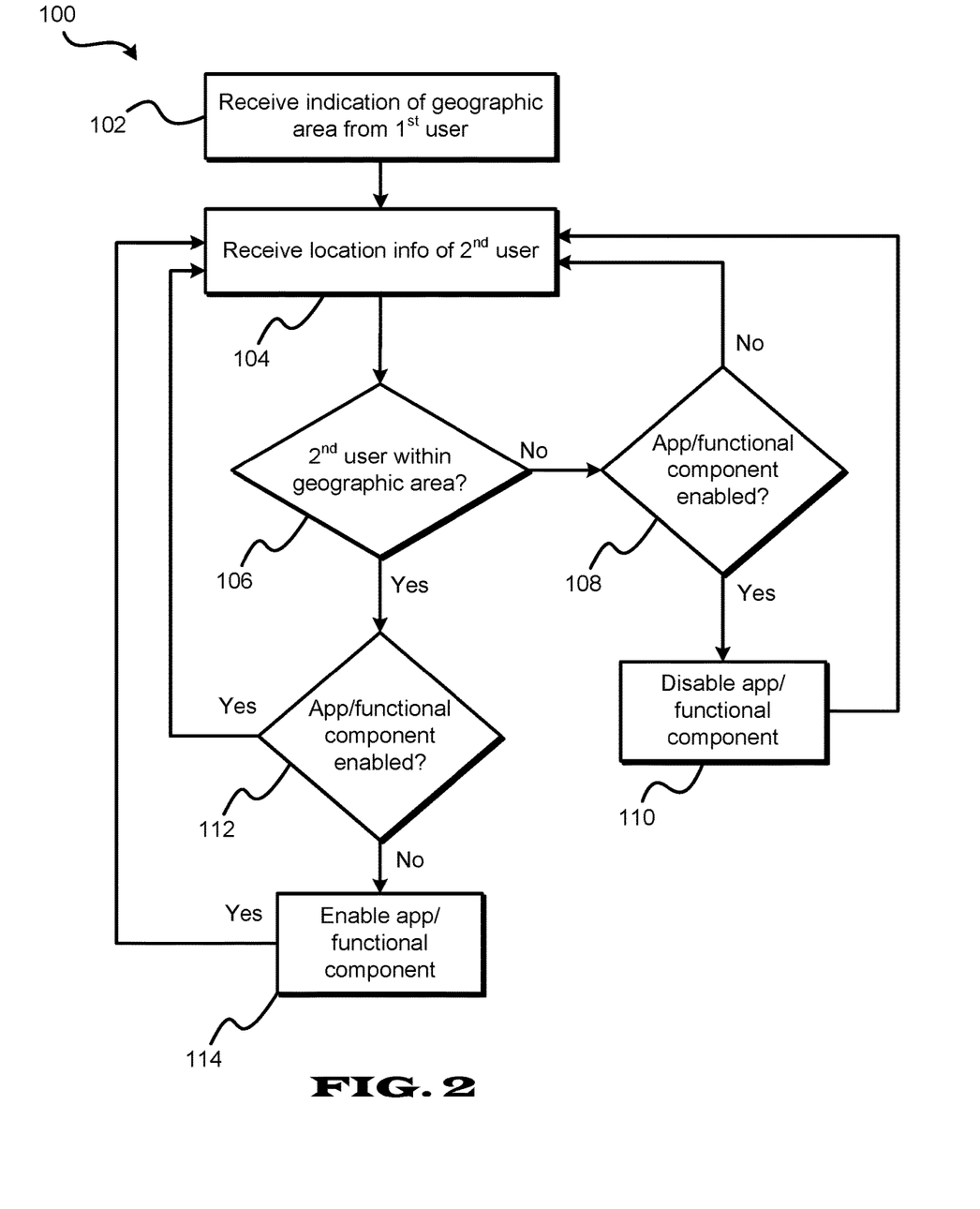
FIGS. 2 and 3 are diagrams showing methods for enabling and disabling mobile device functional components and applications.

Referring to FIG. 2, a method 100 for enabling device use based on user location is shown. The method 100 is described with reference to the components shown in the system 10 of FIG. 1, including the enablement manager 20 and monitoring/enabling agent 13, which are preferably configured for performing the method 100 and include or have access to suitable non-transitory data storage including instructions for performing the method 100. The method 100 may alternatively be performed via other suitable systems.

In a step 102, the enablement manager 20 receives an indication of one or more geographic areas from a first user. The first user can provide the indication via the overseeing user application 28 using a client device 16. The indication can be provided in the form of a request to enable or disable the use by a second user of one or more particular applications and/or one or more particular functional components of the mobile device 12 based on the position of the mobile device 12 in relation to a particular geographic area. For example, the first user can correspond to a parent, and the second user can correspond to a child of the parent for whom the parent desires to control or limit mobile device use.

A functional component is a hardware or software component of the mobile device 12 which enables a particular functionality such as electronic messaging, photo messaging, telephone communication, internet usage, camera usage, video camera usage, or application execution. An application can include for example a gaming application, a social networking application, a video playing application, or any application executable using the mobile device 12.

The indication of a geographic area can include for example an address, a geographic coordinate, or a point of interest such as a local firehouse or local park. The received indication of a geographic area can further include rules for defining the geographic area, for example defining the particular geographic area as the area within 100 feet of a particular address, geographic coordinate, or point of interest. The mapping engine 24 can plot the geographic area based on the indication provided by the first user and based on default or predetermined rules, which determined geographic area can be stored in the mapping database 26.

A geographic area can alternatively include a dynamic geographic area based on a position of another user or a plurality of other users as determined by the location information of such other user or users, wherein the geographic area changes as such other user or users change position. The first user can designate himself/herself as the "other user", wherein the geographic area is based on a position of the first user. Alternatively the first user can designate another trusted user whose position defines the dynamic geographic area. For example, if the first user is a parent of the second user (a young child), the first user may designate herself and her spouse as the users whose positions define the dynamic geographic area.

In step 104 of the method 100, location information of the second user corresponding to the mobile device 12 is received. Location information can be received for example by the monitoring/enabling API 32 from the LDS 15 on the mobile device 12 via the monitoring/enabling agent 13, or alternatively, via a network-accessible position determining entity ("PDE") 45. Alternatively, the location information can be received and maintained by the monitoring/enabling agent 13 on the mobile device 12. The received location information preferably includes GPS data originating from a GPS receiver on the mobile device. Alternatively, location data originating from any suitable source can be accessed.

The location information of the second user is compared with the one or more geographic areas, and it is determined whether the second user's mobile device 12 is within the one or more geographic areas (step 106). The determination of step 106 can be performed for example by the mapping engine 24 of the enablement manager 20 or the monitoring/enabling agent 13 on the mobile device 12.

If in step 106 the second user is determined outside the one or more geographic areas, and if it is determined that the particular application(s) and/or functional component(s) are not enabled (step 108), the process returns to step 104. If in step 106 the second user is determined outside the one or more geographic areas, and if it is determined that the particular application(s) and/or functional component(s) are currently enabled (step 108), the particular application(s) and/or functional component(s) are disabled (step 110), and then the process returns to step 104. If the second user is determined inside the one or more geographic areas (step 106), and if it is determined that the particular application(s) and/or functional component(s) are not already enabled (step 112), the particular application(s) and/or functional component(s) are enabled (step 114), and the process returns to step 104. If the second user is determined inside the one or more geographic areas (step 106), and if it is determined that the particular application(s) and/or functional component(s) are already enabled (step 112), the process returns to step 104. Determining whether the particular application(s) and/or functional component(s) are enabled or disabled on the mobile device 12 and enabling and disabling the application(s) and/or functional component(s) can be performed for example via the monitoring/enabling agent 13, or via the enablement engine 22, or a combination thereof.

The location information of the second user corresponding to the mobile device 12 can include an indication of particular wireless access points or wired access points that the mobile device 12 connects to. Such indication can correspond to for example an identifier of a wireless router. The enablement manager 20 or the monitoring/enabling agent 13 can enable the particular application(s) and/or functional component(s) responsive to determining the mobile device 12 is connected to the particular wireless or wired access point and disable the particular application(s) and/or functional component(s) responsive to determining the mobile device 12 is disconnected from the particular wireless or wired access point. The access point may include for example a Wi-Fi™ protocol router located at the second user's home. In such manner for example a parent can be certain that designated applications and functional components are only used on a child's mobile device at or near the child's home where parent supervision is facilitated.

An access point at which applications and functional components are enabled can be explicitly defined, for example provided with the indication of one or more geographic areas. Alternatively, the access point can be inferred, for example by determining with the enablement manager 20 a particular wireless access point that the mobile device 12 connects to when determined to be within a designated geographic area based on GPS data.

If for example the one or more geographic areas includes a dynamic geographic area based on the position of one or more other users, a distance between the second user and another user can be determined, and the particular application(s) and/or functional component(s) can be enabled responsive to the distance between the second user and the other user being within a particular length. A plurality of users can be designated as defining the dynamic geographic area, wherein if the second user is a particular distance from any one of such other users the particular application(s) and/or functional component(s) are enabled.

The location of another user, such as the first user or a user designated by the first user, is determined based on a position of a mobile device 18 corresponding to such other user. The mobile device 18 location can be provided to the enablement manger 20 via a monitoring agent 19 which accesses location from a location determining system 21 on the mobile device 18. Alternatively, the enablement manager 20 can with appropriate authorization access location information of the mobile device 18 from the position determining entity 45 or other network resource.

The location information of the second user corresponding to the mobile device 12 and the other user corresponding to the mobile device 18 can include an indication of particular wireless access points or wired access points that the mobile devices 12, 18 connect to, for example a router identifier. The enablement manager 20 via the enablement engine 22 can determine whether the mobile device of the second user and the mobile device of another designated user are both connected to the same wired or wireless access point, and if so the particular application(s) and/or functional component(s) are enabled. If the mobile device of the second user and the mobile device of the designated user are not connected to the same wired or wireless access point, the particular application(s) and/or functional component(s) can be disabled.

Figure 3:
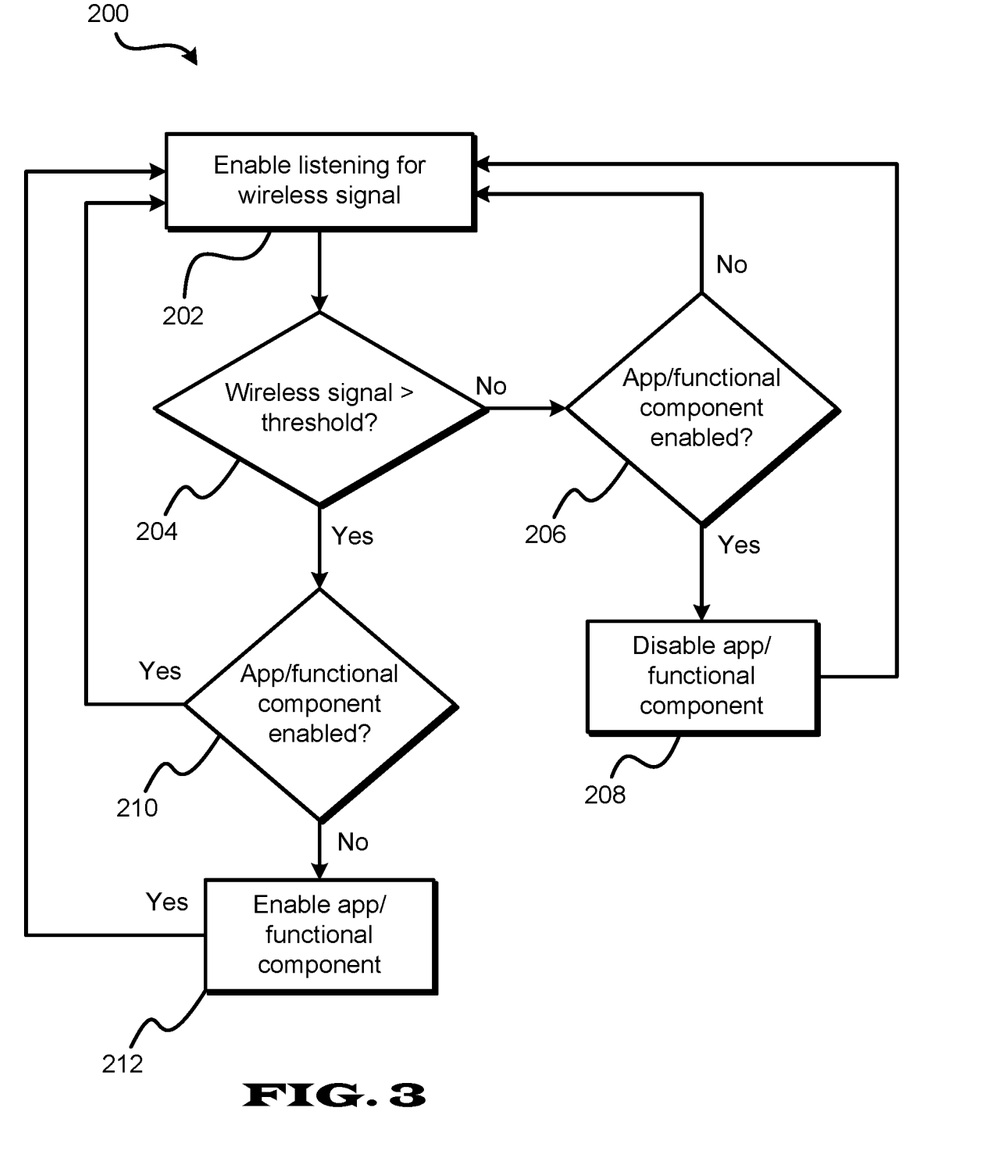

In an alternative implementation the particular application(s) and/or functional component(s) of the mobile device 12 can be enabled responsive to the mobile device 12 of the second user or the mobile device 18 of another designated user receiving a particular wireless signal transmitted from the other mobile device 12, 18. The particular wireless signal can be a Bluetooth™ signal for example, such that when one of the mobile devices 12, 18 is within range of the others wireless signal the application(s) and/or functional component(s) are enabled, and are disabled when out of range. The mobile device 12, 18 can be determined to be out of range when the received strength of the particular wireless signal drops below a particular threshold level. The threshold level can be the level at which the signal is detectable or other measureable level. Referring to FIG. 3, a method 200 is shown illustrating this alternative implementation.

In the method 200, one of the mobile devices 12, 18 is enabled to listen for a particular wireless signal of the other mobile device 12, 18 (step 202). If it is determined that the received strength of the wireless signal is not greater than a particular threshold level (step 204), and that the particular application(s) and/or functional component(s) are enabled (step 206), the particular application(s) and/or functional component(s) are disabled (step 208) and the process returns to step 202. If it is determined that the received strength of the wireless signal is greater than a predetermined threshold level (step 204), and that the particular application(s) and/or functional component(s) are not enabled (step 210), the particular application(s) and/or functional component(s) are enabled (step 212) and the process returns to step 202.

In performing the methods 100, 200 the enablement manager 20 can receive the indication of the one or more geographic areas and designated trusted users from the first user via the overseeing user application 28 and can communicate the indication of the one or more geographic areas from the first user to the monitoring/enabling agent 13 on the mobile device. The monitoring/enabling agent 13 thereafter enables or disables the particular application(s) and/or functional component(s) based on the location of the mobile device 12. Alternatively, the particular application(s) and/or functional component(s) can be enabled or disabled based on instructions from the enablement manager 20 transmitted via the network 40 to the mobile device 12 or a network resource 47 which enables the particular application(s) and/or functional component(s). Status of the mobile device 12 indicating whether the second user is within designated geographic areas and whether application(s) and/or functional component(s) have been enabled or disabled can be provided to a client device 16 of the first user or other user authorized to monitor the second user via the overseeing user application 28.

The particular application(s) and/or functional component(s) can be enabled or disabled at the operating system level of the mobile device 12, at the user interface level, or at the network level. For example, the operating system 11 of the mobile device 12 can be instructed by the monitoring/enabling agent 13 or enablement manager 20 to limit use of an application or functional component. Alternatively, a lock screen in the user interface 17 of the mobile device 12 can be triggered, for example by the monitoring/enabling agent 13, precluding a user from initiating a particular application or functional component when the user is outside a particular geographic area. Alternatively, use of a required network resource 47 can be limited, for example by the enablement manager 20, to enable or disable use of a particular application or functional component on the mobile device 12.

Applications and functional components can be selectively enabled or disabled based on user preference, for example based on selections from the first user. The first user via the overseeing user application 28 can select which applications or functional components are enabled or disabled based on location of the second user. A particular category of applications can be enabled or disabled. For example, applications categorized as game applications or applications tailored toward mature audiences can be enabled or disabled based on the location of the second user. A particular category of internet sites can be enabled or disabled. For example, internet sites categorized as gaming internet sites or sites tailored toward a mature audience can be enabled or disabled based on the location of the second user.

Figure 4A:
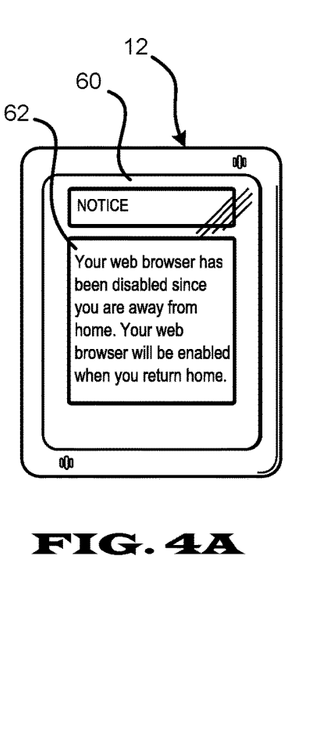
FIGS. 4A-4C show example screen displays enabled by the system of FIG. 1.
Figure 4B:
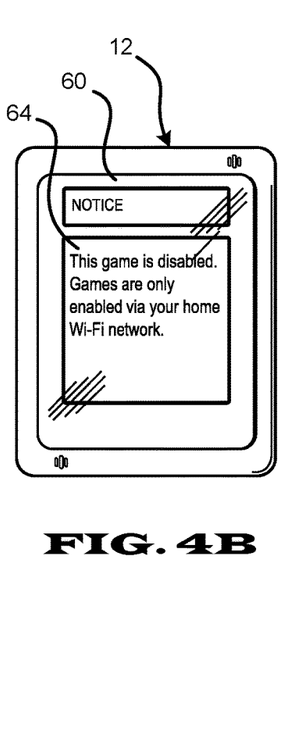
Figure 4C:
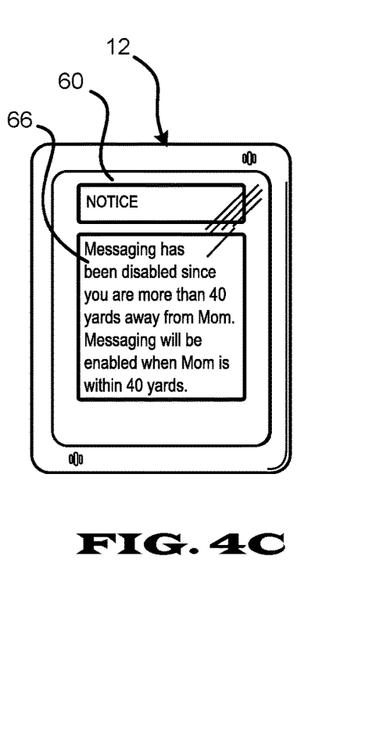

Referring to FIGS. 4A-4C, example screen displays, enabled by the monitoring/enabling agent 13 or the enablement manger 20 through the user interface 17, are shown. FIG. 4A shows a first message 62 on a screen display 60 of the mobile device 12. The first message 62 is shown responsive to disabling of a web browser on the mobile device 12 based on the mobile device user being located outside of a geographic area defined based on the mobile device user's home address. The first message 62 reads: "Your web browser has been disabled since you are away from home. Your web browser will be enabled when you return home." FIG. 4B shows a second message 64 on the screen display 60 of the mobile device 12. The second message 64 is shown responsive to disabling of applications categorized as games on the mobile device based on the mobile device 12 being disconnected from a particular Wi-Fi™ network. The second message 64 reads: "This game is disabled. Games are only enabled via your home Wi-Fi network." FIG. 4C shows a third message 66 on the screen display 60 of the mobile device 12. The third message 66 is shown responsive to disabling a messaging feature based on the mobile device 12 being operated more than 40 yards away from a designated user, for example based on GPS information. The third message 66 reads "Messaging has been disabled since you are more than 40 yards away from Mom. Messaging will be enabled when Mom is within 40 yards."

The methods 100, 200 as performed using components of the system 10 allow applications or functional components of a mobile device to be enabled and disabled based on the location of the mobile device. In such manner a first user can prevent a second user from using particular mobile device applications or functional components outside of particular environments or away from particular designated users. This process is especially valuable to parents concerned that their children may use their mobile device for objectionable or dangerous activity when unsupervised. Example implementations are described below with reference to a parent user and a child user. One skilled in the art will understand that the invention is not limited to a parent-child relationship.

A parent can selectively restrict their child's access to the internet or use of particular applications based on the child's proximity to a trusted adult or place. For example, a parent can choose that their child can only access the internet when they are nearby, or that their child can only play games when at home or at a relative's house.

Software installed on the child's mobile device, for example the monitoring/enabling agent 13, serves to both monitor the state of the child's mobile device and to restrict access to certain applications or mobile device features as needed. A network-connected backend server, for example including the enablement manager 20, and a parent-facing user interface, such as the overseeing user application 28 (e.g. a web application and/or an application on the parent's mobile device), allow a parent to configure the system and establish desired rules and restrictions, white-listing trusted places and/or trusted adults corresponding to geographic areas where mobile device functionality is enabled. The server collects these preferences and manages their transmission to the client on the child's mobile device. The client keeps track of whether conditions are sufficient to allow access to restricted applications or mobile device features (e.g. features enabled by functional components). The client can keep track of whether the child is at a trusted place using explicit positioning methods, such as GPS, or through inference, such as determining that the child is connected to a Wi-Fi™ router previously identified as being at the child's home.

The client on the mobile device can keep track of whether the child is nearby a trusted adult using explicit positioning methods, like GPS, to compare the location of the two mobile devices or through inference, such as noting that the child and trusted adult are connected to the same WiFi router, or by noting that a signal given off by one mobile device (e.g. Bluetooth™) is observed by the other mobile device. Some, but not all of these methods require having a client installed on the trusted adult's mobile device (e.g. the monitoring agent 19) in addition to the child's mobile device (e.g. the monitoring/enabling agent 13).

When acceptable conditions are met, the client on the child's mobile device allows access to the restricted applications or mobile device features. Particular applications, categories of applications (e.g. those rated as for mature audiences), or all applications can be restricted. Mobile device features that can be restricted include voice/video calling, internet usage, sending and receiving of picture messages, image camera use, and video camera use. Internet usage can be blocked entirely or can be restricted for particular sites or categories of sites.

When acceptable conditions are not met, the client on the child's mobile device can deny access to the restricted applications and mobile device features. This can be done by disabling or interfering with their operation at the operating system level, or by effectively frustrating the child's access through use of a lock screen or other preventative user interface ("UI") experience. While the preferred implementation relies on a client on the child's mobile device, the system can also be implemented or supplemented using network-based monitoring (e.g. network based triangulation to determine location) and network-based controls (e.g. internet access is blocked at the network level) for example via integration with a mobile operator's telecommunication infrastructure.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A computer-implemented method of enabling device use, the method comprising:

enabling selection by a first device user of a restricted internet site category by a computing system via a network;

at least one of transmitting or receiving a wireless signal by a first mobile device;

at least one of receiving or transmitting the wireless signal by a second mobile device operated by a second device user;

enabling at least one of a particular application or a particular functional component of the second mobile device responsive to the receiving by at least one of the second mobile device or the first mobile device of the wireless signal, wherein enabling the at least one of the particular application or the particular functional component comprises enabling access to a plurality of internet sites corresponding to the restricted internet site category;

determining that a strength of the received wireless signal as received at least one of by the first mobile device from the second mobile device or by the second mobile device from the first mobile device has decreased below a particular level;

disabling the at least one of the particular application or the particular functional component of the second mobile device responsive to determining that the strength of the received wireless signal has decreased below the particular level, wherein disabling the at least one of the particular application or the particular functional component of the second mobile device comprises disabling access to the plurality of internet sites corresponding to the restricted internet site category; and transmitting to the first device user via the first mobile device an indication of the disabling of the at least one of the particular application or the particular functional component of the second mobile device responsive to determining that the strength of the received wireless signal has decreased below the particular level.

2. The method of claim 1, further comprising:

determining that the strength of the received wireless signal has decreased below a detectable level; and disabling the at least one of the particular application or the particular functional component responsive to determining that the strength of the received wireless signal has decreased below the detectable level.

3. The method of claim 1, further comprising determining the received signal strength is greater than a threshold level, wherein the enabling of the at least one of the particular application or the particular functional component comprises enabling the at least one of the particular application or the particular functional component further responsive to determining the received signal strength is greater than the threshold level.

4. The method of claim 3, wherein the threshold level is equal to the particular level.

5. The method of claim 3, further comprising transmitting to the first mobile device an indication of the enabling of the at least one of the particular application or the particular functional component further responsive to determining the received signal strength is greater than the threshold level.

6. The method of claim 1, wherein the at least one of the particular application or the particular functional component of the at least one of the first mobile device or the second mobile device enables at least one of electronic messaging, electronic photo messaging, telephone communication, internet usage, camera usage, video camera usage, or application execution.

7. The method of claim 1, further comprising:

enabling selection the first device user of a category of applications via a network; and enabling the category of applications responsive to the receiving by the second mobile device of the wireless signal.

8. The method of claim 1, further comprising disabling the at least one of the particular application or the particular functional component at an operating system level of the second mobile device.

9. The method of claim 1, further comprising disabling the at least one of the particular application or the particular functional component via a user interface of the second mobile device.

10. The method of claim 1, further comprising disabling the at least one of the particular application or the particular functional component by limiting use by the second mobile device of a network resource.

* * * * *